(12) United States Patent
Park et al.

(10) Patent No.: US 8,881,183 B2
(45) Date of Patent: Nov. 4, 2014

(54) DISC VISIBLE TYPE DISC DRIVE APPARATUS

(71) Applicant: Samsung Electronics Co., Ltd., Suwon-si (KR)

(72) Inventors: Jun-tae Park, Seoul (KR); Tae-myun Kim, Yongin-si (KR); Young-yun Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/811,605

(22) PCT Filed: Dec. 11, 2012

(86) PCT No.: PCT/KR2012/010752
§ 371 (c)(1),
(2), (4) Date: Jan. 22, 2013

(87) PCT Pub. No.: WO2013/105741
PCT Pub. Date: Jul. 18, 2013

(65) Prior Publication Data
US 2014/0059574 A1 Feb. 27, 2014

(30) Foreign Application Priority Data
Jan. 11, 2012 (KR) .................. 10-2012-0003622

(51) Int. Cl.
*G11B 15/66* (2006.01)
*G11B 17/04* (2006.01)
*G11B 33/02* (2006.01)
*G11B 17/051* (2006.01)

(52) U.S. Cl.
CPC ............ *G11B 15/66* (2013.01); *G11B 17/0404* (2013.01); *G11B 33/022* (2013.01); *G11B 17/051* (2013.01)

USPC ........................................ 720/604

(58) Field of Classification Search
CPC ..... G11B 33/022; G11B 15/66; G11B 17/051
USPC .............. 720/604, 606, 620, 647; 369/30.32, 369/75.11
See application file for complete search history.

(56) References Cited

U.S. PATENT DOCUMENTS 5,544,142 A * 8/1996 Funakiri ..................... 720/650
5,721,715 A * 2/1998 Mitani et al. ............... 369/30.32
(Continued)

FOREIGN PATENT DOCUMENTS

EP 0 296 829 B1 2/1994

OTHER PUBLICATIONS

International Search Report (PCT/ISA/210) dated Apr. 16, 2013, issued in International Application No. PCT/KR2012/010752.

(Continued)

*Primary Examiner* — Angel Castro
(74) *Attorney, Agent, or Firm* — Sughrue Mion, PLLC

(57) ABSTRACT

A disc-visible type disk drive apparatus is disclosed. The disk drive apparatus includes: a main body casing having a first slot provided at a first side surface to load a disc; a protection cover having a first cover provided on the first side surface of the main body casing, wherein the first cover covers a portion of the disc exposed outside the main body casing through the first slot and forms a passage through which the disc passes during loading and unloading; a disc detecting sensor disposed in the first cover which detects the disc; and a disc loading unit disposed in the main body casing and having a loading roller which is driven so as to load the disc if the disc is detected by the disc detecting sensor.

21 Claims, 9 Drawing Sheets

(56) References Cited

U.S. PATENT DOCUMENTS

| | | | |
|---|---|---|---|
| 6,603,724 B1 * | 8/2003 | Numata et al. | 720/604 |
| 6,862,739 B1 * | 3/2005 | Hunter et al. | 720/653 |
| 7,363,636 B2 * | 4/2008 | Suzuki | 720/647 |
| 7,663,999 B2 * | 2/2010 | Omori et al. | 369/75.11 |
| 2005/0028179 A1 | 2/2005 | Ho et al. | |
| 2005/0128892 A1 | 6/2005 | Kuo et al. | |
| 2007/0277188 A1 | 11/2007 | Chiou et al. | |
| 2008/0077947 A1 | 3/2008 | Seki et al. | |
| 2009/0193449 A1 * | 7/2009 | Ito et al. | 720/620 |

OTHER PUBLICATIONS

Written Opinion (PCT/ISA/237) dated Apr. 16, 2013, issued in International Application No. PCT/KR2012/010752.

* cited by examiner

DISC VISIBLE TYPE DISC DRIVE APPARATUS

CROSS-REFERENCE TO RELATED APPLICATIONS

This application claims priority from of Korean Patent Application No. 10-2012-0003622, filed Jan. 11, 2012, in the Korean Intellectual Property Office, the disclosure of which is incorporated herein by reference in its entirety.

BACKGROUND

1. Technical Field

Apparatuses and methods consistent with the present inventive concept relate to a disc-visible type disc drive apparatus, which when mounting a disc, such as CD, DVD and BD, in a main body casing, exposes a portion of the disc outside the main body casing. More particularly, exemplary embodiments relate to a disc-visible type disc drive apparatus capable of preventing foreign substances, such as dust or the like, from getting into the main body casing through an estrangement space between the disc drive apparatus and other equipment combined therewith and/or front and rear portions of the disc exposed outside the main body casing in use.

2. Background Art

A disc drive apparatus, as an apparatus for recording information on a disc, such as a compact disc (CD), Digital Versatile Disc (DVD) and Blu-ray Disc (BD), or reproducing information recorded on the disc, often uses a slot-in type disc drive apparatus into which the disc is inserted through a slot.

The slot-in type disc drive apparatus can reduce a thickness as slim as possible because the disc is inserted through the slot therein. However, the slot-in type disc drive apparatus is configured so that the disc is not exposed to the outside when it is inserted and chucked therein. Thus, there was a limit in that it is always designed to have a width in the disc inserting direction, that is, the forward-backward direction, which is larger than a diameter of recordable or reproducible biggest disc.

To address such a problem, in recent times, there has been proposed a disc-visible type disc drive apparatus in which a main body casing is configured, so that when the disc is inserted therein, front and rear portions of the disc are exposed as much as a given width to the outside, thereby allowing the apparatus to reduce the width in forward-backward direction.

According to such a disc-visible type disc drive apparatus, however, since the front and rear portions of the disc are exposed outside of the main body casing through front and rear slots of the main body casing, foreign substances, such as dust or the like, may enter into the apparatus through an estrangement space between the disc drive apparatus and other equipment combined therewith and/or the front and the rear portions of the disc exposed outside the main body casing, via the front and the rear slots of the main body casing. If the foreign substances enter into the apparatus as described above, they may cause an optical system in the apparatus to reproduce or record information incorrectly or cause a drive part in the apparatus, such as a gear train or the like, to malfunction.

In addition, according to the disc-visible type disc drive apparatus, a loading roller for loading the disc into the main body casing is located in a position where it blocks the front slot at an initial state where there is no disc in the main body casing. Also, as the width in a forward-backward direction is reduced, a space for installing a sensing unit including sensing arms, disc detecting sensors and the like to detect the disc is not available at an entrance of the front slot of the main body casing. As a result, the sensing unit is not disposed in front of the loading roller, but in the rear thereof. Accordingly, to automatically load the disc when inserting the disc into the main body casing at the initial state where there is no disc in the main body casing, a user has to forcibly push the disc against the loading roller blocking the front slot, so that the disc can push the loading roller down, move into the front slot and then operate the sensing unit. Thus, there was a problem in that since the user has to forcibly push the disc until a driving motor is driven to rotate the loading roller by the operation of the sensing unit, she or he should feel a labored disc inserting sensation.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a disc-visible type disk drive apparatus including: a main body casing having a first slot provided at a first side surface to load a disc; a protection cover having a first cover provided on the first side surface of the main body casing, wherein the first cover covers a portion of the disc exposed outside the main body casing through the first slot and forms a passage through which the disc passes during loading and unloading; a disc detecting sensor disposed in the first cover which detects the disc; and a disc loading unit disposed in the main body casing and having a loading roller which is driven so as to load the disc if the disc is detected by the disc detecting sensor.

The main body casing may further include a second slot, which is provided at a second side surface disposed opposite to the first side surface and which may pass through the disc, and the protection cover may further include a second cover, which is provided on the second side surface of the main body casing and may cover a portion of the disc exposed outside the main body casing.

The first and the second covers may each have an arc-like shape.

The second cover may close the portion of the disc exposed outside the main body casing through the second slot, so as to not to let the portion of the disc be exposed outside of the main body casing.

The loading roller may be disposed to pivot between a first position blocking the first slot and a second position opening the first slot, wherein the disc loading unit may further include: a loading roller lifting part which lifts and lowers the loading roller between the first position and the second position; and a drive part to drive the loading roller and the loading roller lifting part according to an operation of the disc detection sensor and a drive command which is input.

The loading roller lifting part may move the loading roller: to the first position if the disc is in an ejecting position, to the second position if in a chucking position, and to a third position not coming in contact with the disc if the disc is removed outside the main body casing.

The third position may include one of the second position and an intermediate position where, if the disc is inserted into the main body casing, the loading roller is positioned in a state just before coming in contact with the disc, which is being inserted.

The third position may include one of the second position and the intermediate position.

The loading roller lifting part may include: a loading roller support which supports the loading roller to be pivotable between the first position and the second position; a lifting protrusion on the loading roller support; a slider having a lifting cam groove accommodates and guides the lifting protrusion to lift or lower the lifting protrusion as the slider is being moved right and left; and a slider moving portion which moves the slider right and left.

The lifting cam groove may guide the lifting and lowering of the lifting protrusion, so that the loading roller support has the loading roller be pivotable to one of the first position, the second position and the third position.

The slider moving portion may include: a moving protrusion projected from the slider; and a moving guide groove, which is provided in a cam gear of a chucking unit driven by the drive part, and which moves the moving protrusion right and left according to a rotation of the cam gear.

The disc detection sensor may include one of an optical sensor and a micro switch.

The disc loading unit further may include: a sensing arm part disposed in the main body casing and having first and second sensing arms, each of which has a hanging protrusion projected into a disc moving path to be moved by the disc; and at least one sensing switch, which is disposed in the main body casing and which is operated by one of the first and second sensing arms and sensing the disc.

According to another aspect of an exemplary embodiment, there is provided a disc drive apparatus, including: a main body casing having a slot to load a disc; a sensing unit disposed in the main body casing to sense the disc; and a loading roller disposed in the main body casing to be pivotable between a first position blocking the slot and a second position opening the slot, the loading roller being maintained in a third position not coming in contact with a disc if there is no disc in the main body casing, wherein the loading roller is operated to load the disc into the main body casing and to pivot from the third position to the first position if the disc is detected by the sensing unit.

The apparatus may further include: a loading roller lifting part to lift and lower the loading roller between the first position and the second position according to an operation of the sensing unit and an outer ejecting command.

The third position may include one of the second position and an intermediate position where, if the disc is inserted into the main body casing, the loading roller is positioned in a state just before coming in contact with the disc, which is being inserted.

The loading roller lifting part may include: a loading roller support to support the loading roller to be pivotable between the first position and the second position; a lifting protrusion provided on the loading roller support; a slider having a lifting cam groove to accommodate and guide the lifting protrusion to lift or lower the lifting protrusion as the slider is being moved right and left; and a slider moving portion to move the slider right and left.

The lifting cam groove may be provided to guide the lifting and lowering of the lifting protrusion, so that the loading roller support has the loading roller be pivotable to one of the first position, the second position and the third position.

The apparatus may further include: a drive part to drive the loading roller and the loading roller lifting part, wherein the slider moving portion may include: a moving protrusion projected from the slider; and a moving guide groove formed in a cam gear of a chucking unit driven by the drive part, to move the moving protrusion right and left according to a rotation of the cam gear.

The sensing unit may include: a sensing arm part disposed in the main body casing and having first and second sensing arms, each of which has a hanging protrusion projected into a disc moving path to be moved by the disc; and at least one sensing switch, which is disposed in the main body casing to be operated by one of the first and second sensing arms, and which senses the disc.

The at least one sensing switch may include first and second switches, which are operated by first and second operating portions, respectively, wherein the first and second switches are provided on an outer side of a lower portion of the first sensing arm.

BRIEF DESCRIPTION OF THE DRAWINGS

The above and/or other aspects will become more apparent by describing certain exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
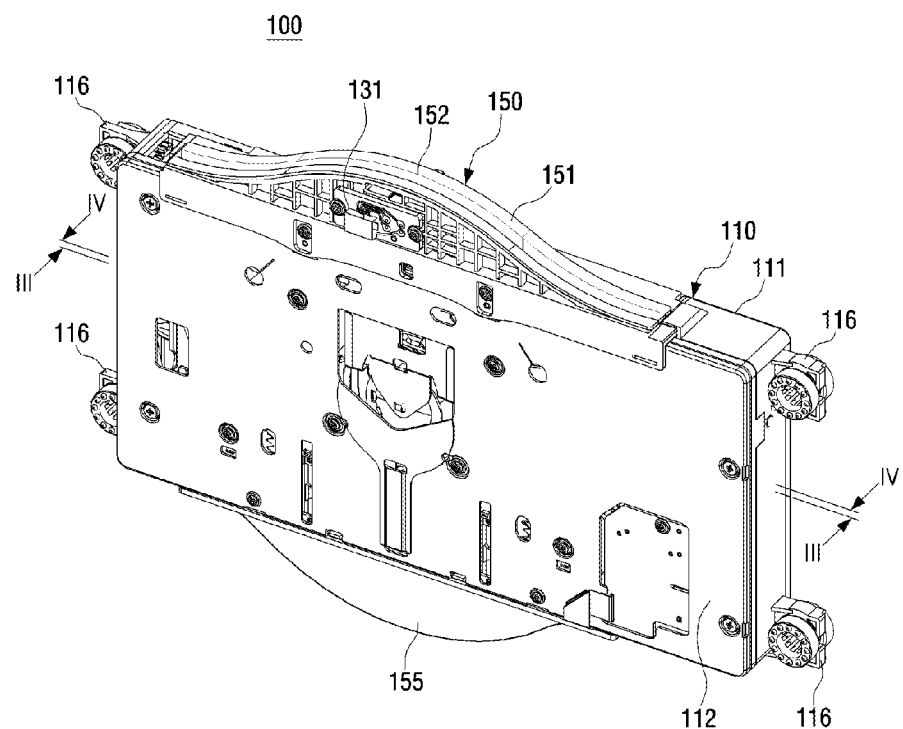
FIG. 1 is a perspective view showing a disc drive apparatus according to a first exemplary embodiment.

Hereinafter, a disc drive apparatus according to exemplary embodiments will be described in greater detail below with reference to the accompanying drawings. In the following description, same drawing reference numerals are used for the same elements or equivalents even in different drawings.

First Embodiment

First, referring to FIG. 1, there is illustrated a disc drive apparatus 100 according to a first exemplary embodiment in a perspective view.

Figure 3:
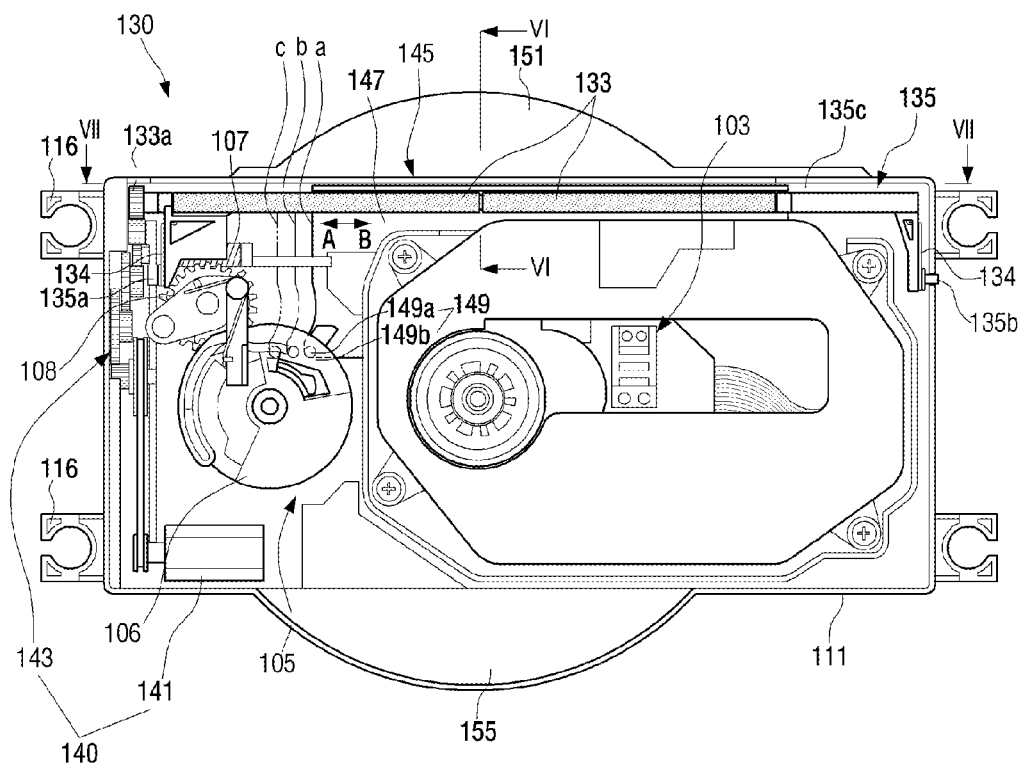
FIG. 3 is a top plan view of a rectangular member of a main body casing of the disc drive apparatus shown along line III-III of FIG. 1.

As shown in FIG. 1, the disc drive apparatus 100, as a disc-visible type disc drive apparatus capable of being combined and used with other image and/or audio equipment, such as TV or the like, includes a main body casing 110, a disc loading unit 130, as shown in FIG. 3, and protection cover 150.

The main body casing 110 is formed in an approximately rectangular shape. For this, the main body casing 110 is made up of a rectangular member 111 having one side opened and a cover member 112 to cover the opened one side of the rectangular member 111.

Figure 2:
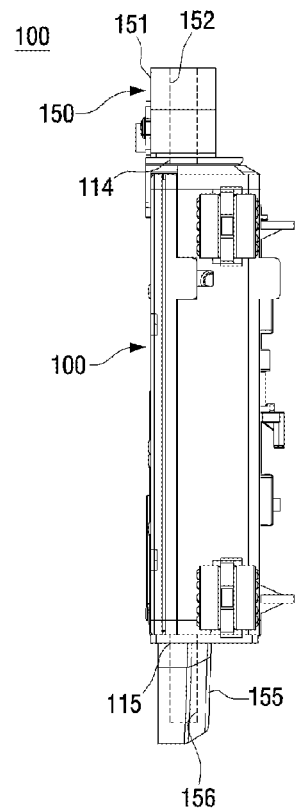
FIG. 2 is a side elevation of the disc drive apparatus shown in FIG. 1.

As shown in FIG. 2, a first slot 114 through which a disc D (see also FIGS. 6A to 7C) is inserted is formed at a first side surface, for example, an upper surface of the main body casing 110 between the rectangular member 111 and cover member 112. In addition, a second slot 115 through which when the disc D is in a chucking position, a front portion (in inserting direction) thereof is projected outside the main body casing 110 is formed at a second side surface, for example, a lower surface of the main body casing 110 between the rectangular member 111 and cover member 112. The first and the second slots 114 and 115 are connected in a disc inserting direction through an inner space between the rectangular member 111 and cover member 112 of the main body casing 110.

On both side surfaces of the rectangular member 111 are provided mounting brackets 116 for mounting the disc drive apparatus 100 on the other image and/or audio equipment.

As shown in FIG. 3, in the main body casing 110 are disposed an optical system 103 having an optical pickup device for recording or reproducing information on or from the disc D, such as CD, DVD, and BD, a disc loading unit 130 for loading the disc D to be described later, and a chucking unit 105 for chucking the loaded disc.

Such a main body casing 110 has a width or depth in disc inserting direction less than a standard disc having a predetermined size, for example, a diameter of 12 cm, so that when the standard disc is inserted through the first slot 114 and positioned in a chucking position, front and rear portions (in inserting direction) thereof are projected outside the main body casing 110 through the first and the second slots 114 and 115, respectively.

The protection cover 150 is provided on the first and second side surfaces, that is, the upper and the lower surfaces of the main body casing 110. The protection cover 150 prevents foreign substances, such as dust or the like, from getting into the main body casing 110 through an estrangement space between the disc drive apparatus 100 and the other image and/or audio equipment combined therewith and/or the front and the rear portions of the standard disc projected outside the main body casing 110 through the first and the second slots 114 and 115. Also, the protection cover 150 absorbs or shuts off noises generated in the main body casing 110 to minimize leakage thereof outside the main body casing 110. For this, the protection cover 150 includes a first cover 151 and a second cover 155.

The first cover 151 is disposed on the upper surface of the main body casing 110. The first cover 151 is made up of approximately parallel two members in a form of an arc, i.e., in an arc-like shape, so that when the disc D is in the chucking position, they cover the rear portion thereof projected outside the main body casing 110 through the first slot 114. The two members in the form of the arc are disposed on the rectangular member 111 and cover member 112, respectively. Accordingly, in the first cover 151 there is formed a cover slot 152, which connects between the first slot 114 and the outside to form a passage through which the disc D passes.

The second cover 155 is disposed on the lower surface of the main body casing 110. The second cover 155 made up of a c-shaped member in a form of an arc, i.e., in an arc-like shape, so that when the disc D is in the chucking position, it wraps and closes the front portion of the disc D projected outside the main body casing 110 through the second slot 115. Accordingly, in the second cover 152 is formed a closing-up slot 156, one side of which communicates with the second slot 115 to pass the disc D therethrough and the other side of which closes the front portion of the disc not to let it be exposed to the outside.

With such configurations of the first and the second cover 151 and the 155, the disc drive apparatus 100 can maximally prevent the foreign substances, such as dust or the like, from getting into the main body casing 100 through the estrangement space between the disc drive apparatus and the other image and/or audio equipment combined therewith and/or the front and the rear portions of the standard disc exposed outside the main body casing 110 in use as in the related art disc-visible type disc drive apparatus, and also absorb or shut off the noises generated in the main body casing 110 to minimize the leakage thereof outside the main body casing 110.

Figure 4:
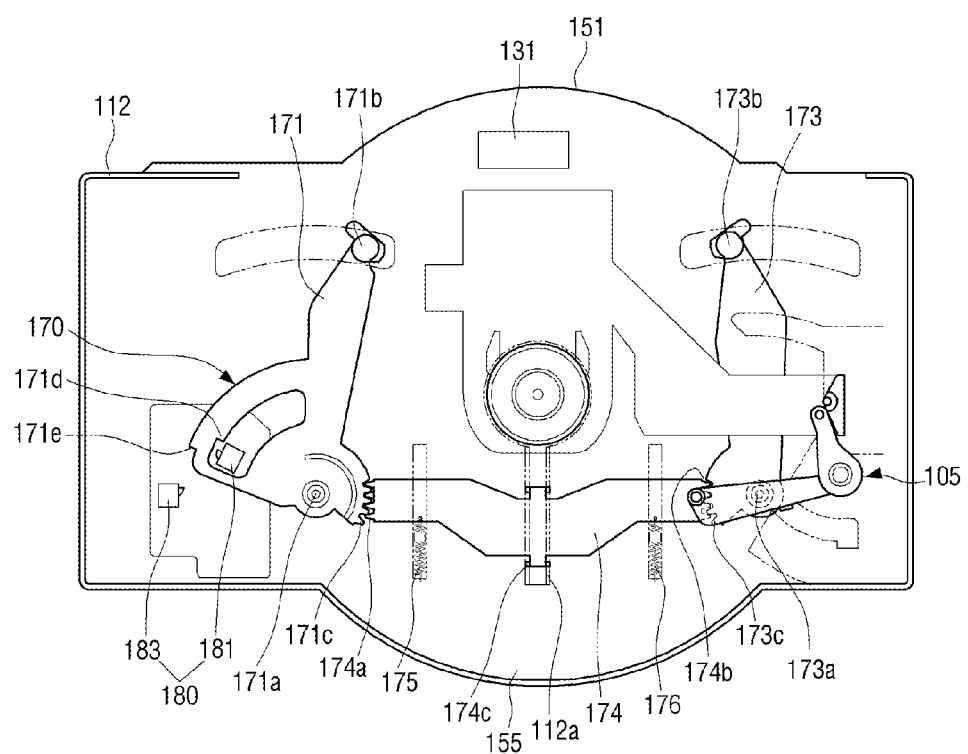
FIG. 4 is a top plan view of a plate member of the main body casing of the disc drive apparatus shown along line IV-IV of FIG. 1.
Figure 5:
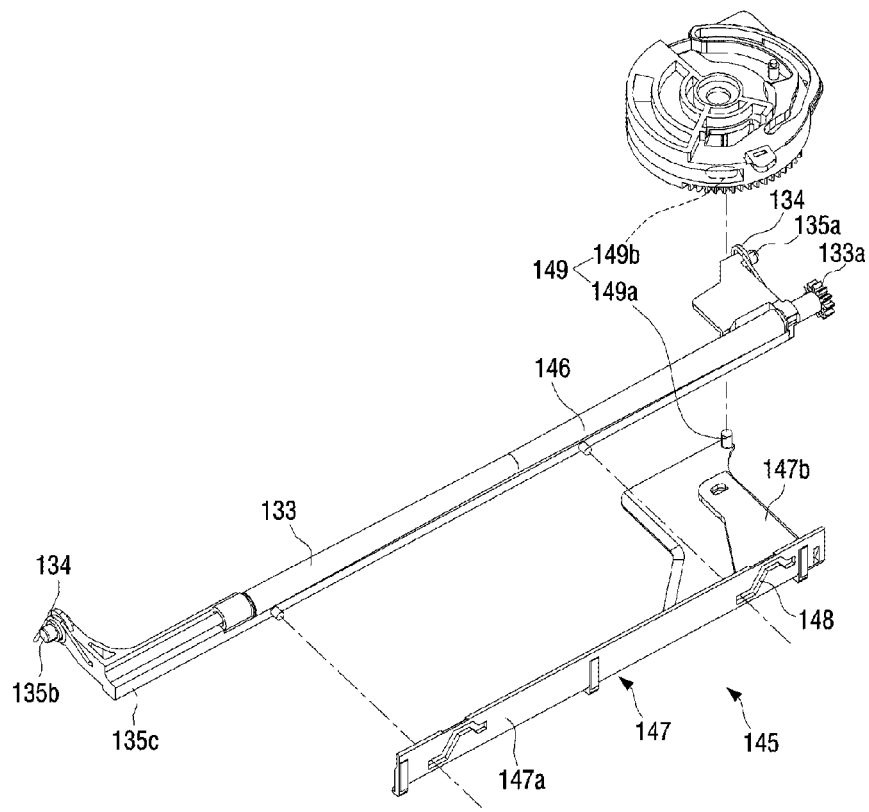
FIG. 5 is a perspective view of a loading roller lifting part of the disc drive apparatus shown in FIG. 1.

Referring to FIGS. 3 to 5, the disc loading unit 130, which is for moving the disc D to the chucking position in the main body casing 110 when the disc D is inserted into the main body casing 110, includes a disc detecting sensor 132, a loading roller 133, and a loading roller lifting part 145.

As shown in FIGS. 1 and 4, the disc detecting sensor 131 is disposed in the first cover 151. The disc detecting sensor 131 may be made up of an optical sensor, such as a reflection or transmission type photo sensor with a light emitting part and a light receiving part. At an initial operation stage of the disc drive apparatus 100, when the disc D is inserted through the cover slot 152 of the first cover 151, such a disc detecting sensor 131 detects the disc D and outputs a detecting signal, that is, an 'OFF' signal of the optical sensor, to a control unit (not shown). The control unit controls a driving motor 141 of a drive part 140 to drive in a normal or reverse direction according to the 'OFF' signal from the disc detecting sensor 131.

As shown in FIG. 3, the drive part 140 includes a driving motor 141 as described above and a gear train 143 including pulley and gears connected with the driving motor 141.

The loading roller 133 is formed of an elastic material, such as rubber or urethane, and is disposed adjacent and parallel to the first slot 114 in the rectangular member 111 of the main body casing 110. The loading roller 133 at a right end thereof (see FIG. 3) is inserted and rotatably supported in an elongated recess formed at a body 135c of a loading roller support 135. Also, the loading roller 133 is connected with the gear train 143 of the drive part 140 through a driving gear 133a formed on a left end thereof (see FIG. 3).

The loading roller support 135 is formed of a c-shaped body 135c, and is pivotably supported to the rectangular member 111 by axes 135a and 135b formed on left and right ends thereof, as shown in FIG. 3, respectively. In addition, as shown in FIGS. 6A to 6C, the loading roller support 135 is elastically urged in a direction of bringing the loading roller 133 in contact with the disc D by torsion springs 134 at the axes 135a and 135b of the right and left ends thereof.

Figure 6A:
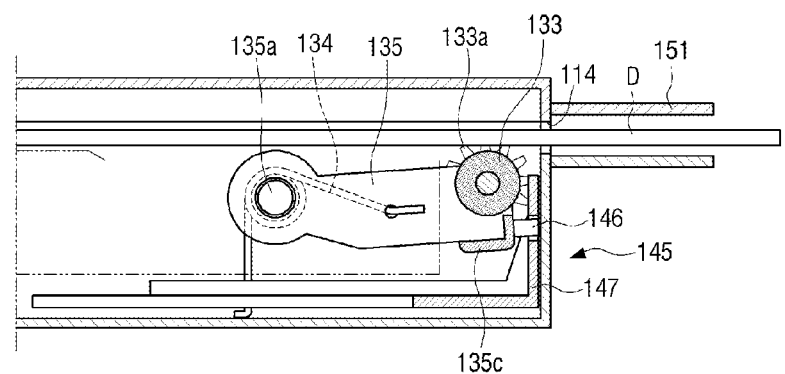
FIGS. 6A to 6C are views showing an operation of the loading roller lifting part shown along line VI-VI of FIG. 3
Figure 6B:
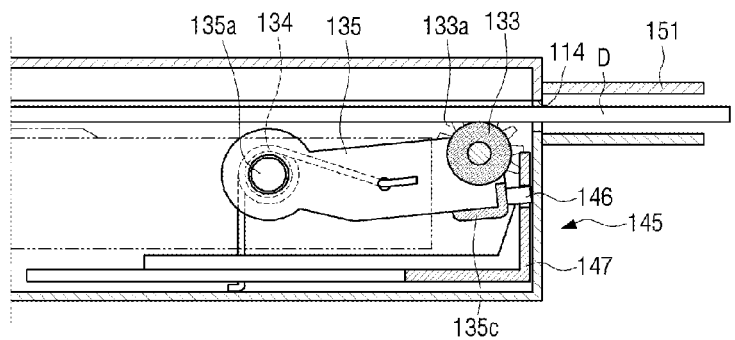
Figure 6C:
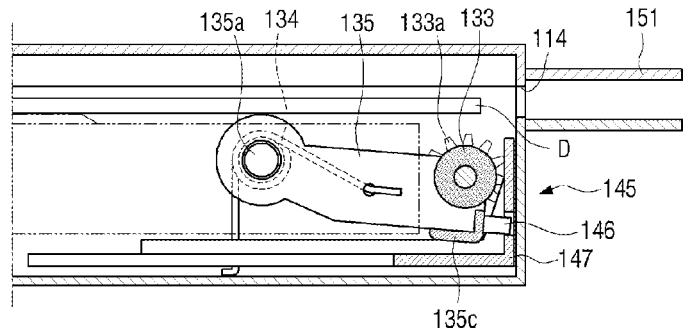

Also, as shown in FIGS. 6A to 6C, the loading roller support 135 may be lifted or lowered to a first position, a second position and a third position by the loading roller lifting part 145, which is operated by a driving force of the driving motor 141 of the drive part 140. The first position is a position where the loading roller 133 blocks up the first slot 114, for example, a lifted position (that is, a position where when the disc D is inserted through the first slot 114, the loading roller 133 comes in press contact with the disc D), as shown in FIG. 6B. The second position is a position where the loading roller 133 completely opens the first slot 114, for example, a lowered position (that is, a position where when the disc D is inserted through the first slot 114, the loading roller 133 completely stays away from the disc D, as shown in FIG. 6C. The third position is a position where the loading roller 133 is not to come in contact with the disc D, for example, an intermediate position between the lifted position and the lowered position (that is, a position where when the disc D is inserted through the first slot 114, the loading roller 133 is positioned in a state just before coming in contact with the disc D, which is spaced by a thickness of the disc D, for example, approximately 0.5 mm, apart from the disc D), as shown in FIG. 6A. Here, although the third position is explained and illustrated as the position where the loading roller 133 is positioned in the state just before coming in contact with the disc D, it may be any of positions between the lowered position and the intermediate position, including the lowered position and the intermediate position according to designs if the loading roller 133 does not come in contact with the disc D.

As shown in FIG. 5, the loading roller lifting part 145 includes a lifting protrusion 146, a slider 147 having a lifting cam groove 148 formed therein, and a slider moving portion 149 for moving the slider 147 right and left (i.e., either right or left at any given time).

The lifting protrusion 146 is formed, so that it is projected outward below the recess of the body 135c of the loading roller support 135 in which the loading roller 133 is inserted. The lifting cam groove 148 is formed corresponding to the lifting protrusion 146 in a vertically bent portion 147a of the slider 147, and accommodates and guides the lifting protrusion 146 to lift or lower as the slider 147 is moved right and left, that is, in directions of arrow A and B, as shown in FIG. 7B, by the slider moving portion 149.

Figure 7A:
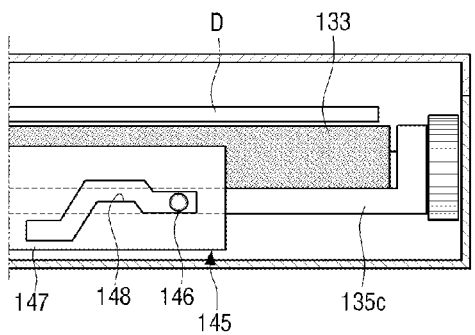
FIGS. 7A to 7C are views showing the operation of the loading roller lifting part shown along line VII-VII of FIG. 3
Figure 7B:
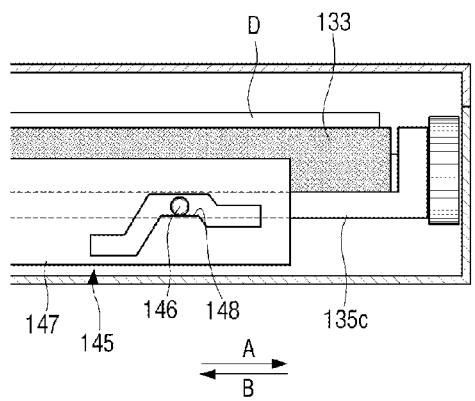

To be specific, when the slider 147 is in a position of solid line a in FIG. 3, the lifting protrusion 146 is located in a position shown in FIG. 7A in the lifting cam groove 148. At this time, the loading roller support 135 is positioned in an intermediate position shown in FIG. 6A by the lifting protrusion 146. In this state, when the slider 147 moves in the direction of arrow A to a position of alternated long and short dashed line b in FIG. 3, the lifting protrusion 146 is positioned in a position shown in FIG. 7B in the lifting cam groove 148. At this tine, the loading roller support 135 is positioned in a lifted position shown in FIG. 6B by the lifting protrusion 146. Also, when the slider 147 further moves in the direction of arrow A to a position of alternated long and two short dashed line c in FIG. 3, the lifting protrusion 146 is located in a position shown in FIG. 7C in the lifting cam groove 148. At this time, the loading roller support 135 is positioned in a lowered position shown in FIG. 6C by the lifting protrusion 146. To the contrary, when the slider 147 moves in the direction of arrow B from the position of alternated long and two short dashed line c to the position of alternated long and short dashed line b in FIG. 3, the lifting protrusion 146 and the loading roller support 135 are positioned in corresponding positions as explained above, respectively.

The slider moving portion 149 is made up of a moving protrusion 149a, and a moving guide groove 149b. The moving protrusion 149a is formed on and vertically projected from an inner end of a horizontal portion 147b of the slider 147. The moving guide groove 149b is formed on a bottom surface of a cam gear 106 of a chucking unit 105, and accommodates and guides the moving protrusion 149a to move the moving protrusion 149a and the slider 147 right and left according to a rotation of clockwise or counterclockwise direction of the cam gear 106.

At this time, the moving guide groove 149b may be formed in such a shape that the slider 147 is positioned corresponding to the rotated position of the cam gear 107. For example, the shape of the moving guide groove 149b may be formed, so that the slider 147 is operated as follows: If the diving motor 141 is driven in a normal or reverse direction according to an 'OFF' signal of the disc detecting sensor 131 and thus the cam gear 106 is rotated form an initial position to a chucking position for chucking the disc D, the slider 147 is moved to the position of alternated long and two short dashed line c from the position of solid line a via the position of alternated long and short dashed line b in FIG. 3, so that the loading roller support 135 is positioned in the lowered position. If the diving motor 141 is driven in a normal or reverse direction according to a disc ejecting command by a disc ejecting button operation of a user or the like and thus the cam gear 106 is rotated form the chucking position to an ejecting position, the slider 147 is moved to the position of alternated long and short dashed line b from the position of alternated long and two short dashed line c in FIG. 3, so that the loading roller support 135 is positioned in the lifted position. At this time, If the ejected disc D is removed to the outside by the user to allow the diving motor 141 to be more driven in the normal or reverse direction, the slider 147 is moved in the position of solid line a in FIG. 3, so that the loading roller support 135 is positioned in the intermediate position.

The cam gear 106 is connected with the gear train 143 through a worm 107 and a worm gear 108, so that it is driven by the driving force of the driving motor 141. Since construction and operation of the cam gear 106 are the same as those of the cam gear known in the art except that it has the moving guide groove 149b formed at the bottom surface thereof, more detailed explanation thereon will be omitted.

On the other hand, to reduce power consumption of the disc drive apparatus 100 or the other image and/or audio equipment combined therewith, the power disc drive apparatus 100 may be designed, so that if the disc drive apparatus 100 or/and the other image and/or audio equipment is turned off, a power supply to the disc detection sensor 132 disposed in the first cover 151 is also shut off. In this case, because the disc detection sensor 132 does not operate even though the disc D is inserted through the first cover 151, the disc drive apparatus 100 does not embody a function of automatically moving or conveying the disc D to the chucking position.

Accordingly, when the disc D is inserted through the first slot 114 in a state where the disc drive apparatus 100 or the other image and/or audio equipment combined therewith are turned off, to physically detect the disc D thus to automatically convey it to the chucking position and at the same time, detect a size of the disc D thus to control the driving of the driving motor 141, the disc loading unit 130 may further include a sensing arm part 170 and at least one sensing switch 180, which form a sensing unit for sensing the disc D, as shown in FIG. 4.

The sensing arm part 170 is disposed at the cover member 112 of the main body casing 110, and includes first and second sensing arms 171 and 173 and a link member 174.

The first and the second sensing arms 171 and 173 at lower portions thereof are rotatably fixed on first and second rotation axes 171a and 173a disposed at the cover member 112, respectively. In addition, the first and the second sensing arms 171 and 173 at upper ends thereof have hanging protrusions 171b and 173b projected into a disc moving path, respectively. When the disc D is inserted through the first slot 114, the hanging protrusions 171b and 173b are pushed by the disc D to rotate the first and the second sensing arms 171 and 173 in a direction moving away from each other about the first and the second rotation axes 171a and 173a.

The link member 174 at both ends thereof has first and second partial teeth 174a and 174b formed to be engaged with first and second corresponding partial teeth 171c and 173c formed at lower portions of the first and the second sensing arms 171 and 173, and at a center thereof, has a guide protrusion 174c formed to be inserted into a guide hole 112a of the cover member 112 and to be guided up and down.

The link member 174 is elastically urged to be pulled down by an elastic force applied thereto by first and second compression springs 175 and 176, and thus the first and the second sensing arms 171 and 173 are elastically pressed to rotate in a direction toward to each other.

The sensing switch 180 include first and second switches 181 and 183, which are operated by first and second operating portions 171d and 171e formed on an outer side of the lower portion of the first sensing arm 171.

The first switch 181 is disposed in a position where it can be operated by the first operating portion 171d of the first sensing arm 171, which is rotated by a disc D having a first size, for example, a diameter of 6 cm, when it is inserted through the first slot 114. Also, the second switch 183 is disposed in a position where it can be operated by the second operating portion 171e of the first sensing arm 171, which is rotated by a disc D having a second size, for example, a diameter of 12 cm, when it is inserted through the first slot 114. Such first and second switches 181 and 183 may be made up of micro switches.

Accordingly, if only the first switch 181 is operated, the control unit determines that the disc D having the diameter of 6 cm is inserted, and controls a driving time of the driving motor 141 or the like corresponding thereto. Also, if both the first switch 181 and the second switch 183 are operated, the control unit determines that the disc D having the diameter of 12 cm is inserted, and controls a driving time of the driving motor 141 or the like corresponding thereto.

A driving process of the disc drive apparatus 100 according to the first exemplary embodiment as constructed as described above will now be described with reference to FIGS. 8 and 9.

Figure 8:
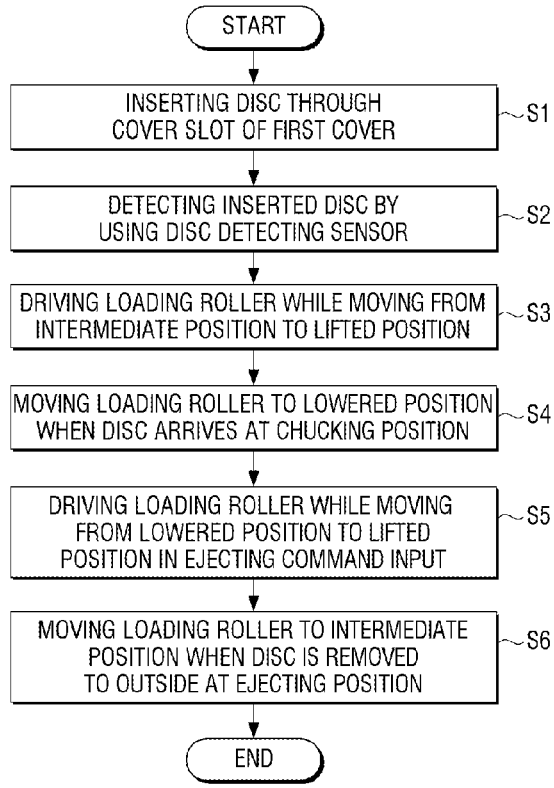
FIG. 8 is a flow chart showing an operation of the disc drive apparatus according to the first exemplary embodiment when it is in a turned-on state.

First, assuming that the disc drive apparatus 100 is in a turned-on state, a disc D is inserted into the main body casing 110 through the cover slot 152 of the first cover 151 by a user, as shown in FIG. 8 (S1).

The optical sensor of the disc detecting sensor 131 detects the inserted disc D, and outputs an 'OFF' signal to the control unit (S2).

The control unit controls to drive the driving motor 141, for example, in a normal direction, according the 'OFF' signal from the disc detecting sensor 131. As the driving motor 141 is driven, the loading roller 133 is rotated, for example, in a counterclockwise direction, by a driving force of the driving motor 141, which is transmitted to the driving gear 133a through the gear train 143.

At the same time, the cam gear 106 is rotated, for example, in a counterclockwise direction, by the driving force of the driving motor 141, which is transmitted through the gear train 143 and the worm 107 and the worm gear 108. As a result, the slider 147 is moved in a direction arrow A from a position of solid line a in FIG. 3, as shown in FIG. 7A, to a position of alternated long and short dashed line b in FIG. 3, as shown in FIG. 7B, and thereby the loading roller support 135 is moved from an intermediate position, as shown in FIG. 6A, where the loading roller 141 does not come in contact with the disc D to a lifted position, as shown in FIG. 6B, where the loading roller 141 comes in press contact with the disc D (S3). Accordingly, the loading roller 133 conveys the disc D to a chucking position while rotating in contact therewith.

At this time, as the disc D is inserted, the first sensing arm 171 of the sensing arm part 170 is pushed by the disc D to operate the first and/or the second switch 181 and 183, and the control unit determines a size of the disc D whether the first and/or the second switch 181 and 183 is operated and controls a driving time of the driving motor 141 for conveying the disc D to the chucking position or the like according to the determined result, thereby to convey the disc D to the chucking position.

Figure 7C:
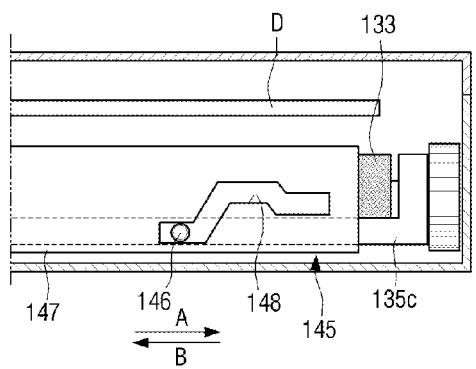

As the driving motor 141 continues to rotate, the loading roller 141 conveys the disc D to the chucking position. At the same time, the chucking unit 105 chucks the disc D in the method known in the art by using the cam gear 106. Also, the slider 147 is moved to a position of alternated long and two short dashed line c in FIG. 3, as shown in FIG. 7C, and the loading roller support 135 is moved to a lowered position shown in FIG. 6C by the lifting protrusion 146 (S4).

In this state, a reproducing or recoding button, which is not shown, is pushed by the user to reproduce information recorded on the disc D or record information on the disc D.

After that, to eject the disc D, if an ejecting button, which is not shown, is pushed by the user, the control unit controls the driving motor 141 to drive in a reverse direction. As the driving motor 141 is driven in the reverse direction, the chucking unit 105 releases the disc D from the chucking state through the cam gear 106 and at the same time, the slider 147 and the loading roller support 135 are operated in a manner opposite to that in the loading, so that they are moved to the position of alternated long and short dashed line b in FIG. 3 (FIG. 7B) and the lifted position shown in FIG. 6B, respectively (S5). At this time, a portion of the disc D is projected outside the first cover 151 and the loading roller 133 is maintained in a state where it is in contact with the disc D in a given pressure by the torsion spring 134.

In this state, if the disc D is removed to the outside with the projected portion thereof grasped by the user, the optical sensor of the disc detecting sensor 131 and the micro switches of the first and the second switches 181 and 183 of the sensing switch 180 output an 'ON' signal and 'OFF' signals to the control unit, respectively. According to the signals from the disc detecting sensor 131 and the sensing switch 180, the control unit controls the driving motor 141, so that the driving motor 141 is more driven in the reverse direction. According to this, the slider 147 and the loading roller support 135 are moved to the position of solid line a in FIG. 3 (FIG. 7A) and the intermediate position shown in FIG. 6A, respectively. As result, the loading roller 133 is maintained in a position where when the disc D is inserted through the first slot 114, it is in a state just before coming in contact with the disc D, which is spaced by a thickness of the disc D, for example, approximately 0.5 mm, apart from the disc D. Accordingly, even though at an initial insertion stage where a next disc D is inserted, a front portion of the next disc D enters the first slot 114 through the first cover 151 before the disc detecting sensor 131 operates, it can be smoothly inserted into the first slot 114. This, a disc inserting sensation or feeling of user is improved.

Figure 9:
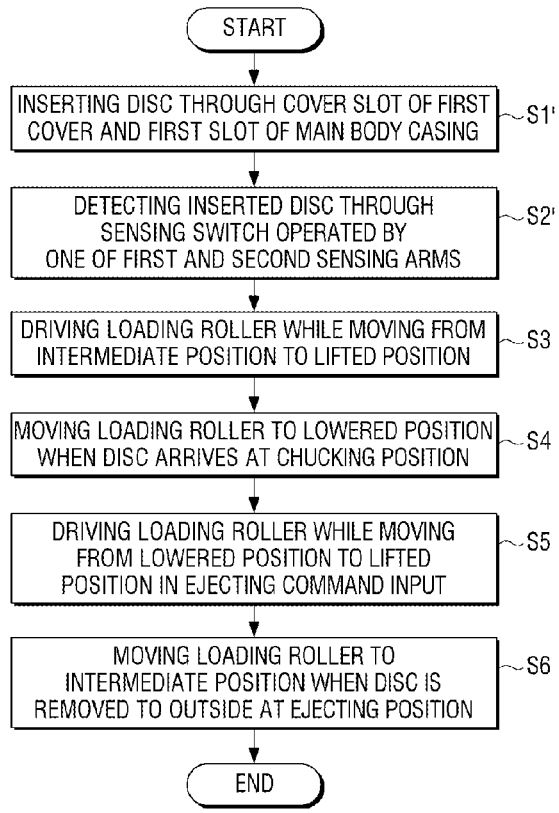
FIG. 9 is a flow chart showing an operation of the disc drive apparatus according to the first exemplary embodiment when is in a turned-off state.
Figure 10:
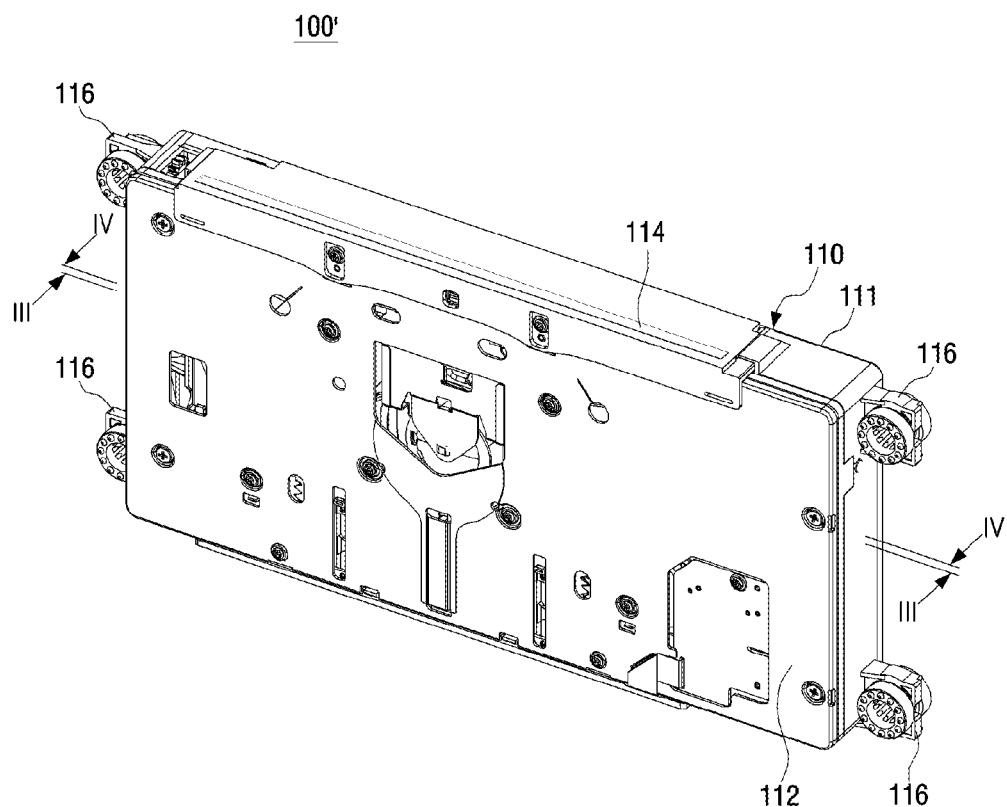
FIG. 10 is a perspective view showing a disc drive apparatus according to a second exemplary embodiment.
Figure 11:
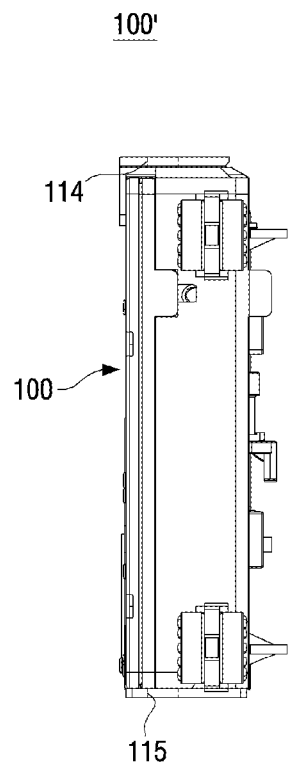
FIG. 11 is a side elevation of the disc drive apparatus shown in FIG. 10.
Figure 12:
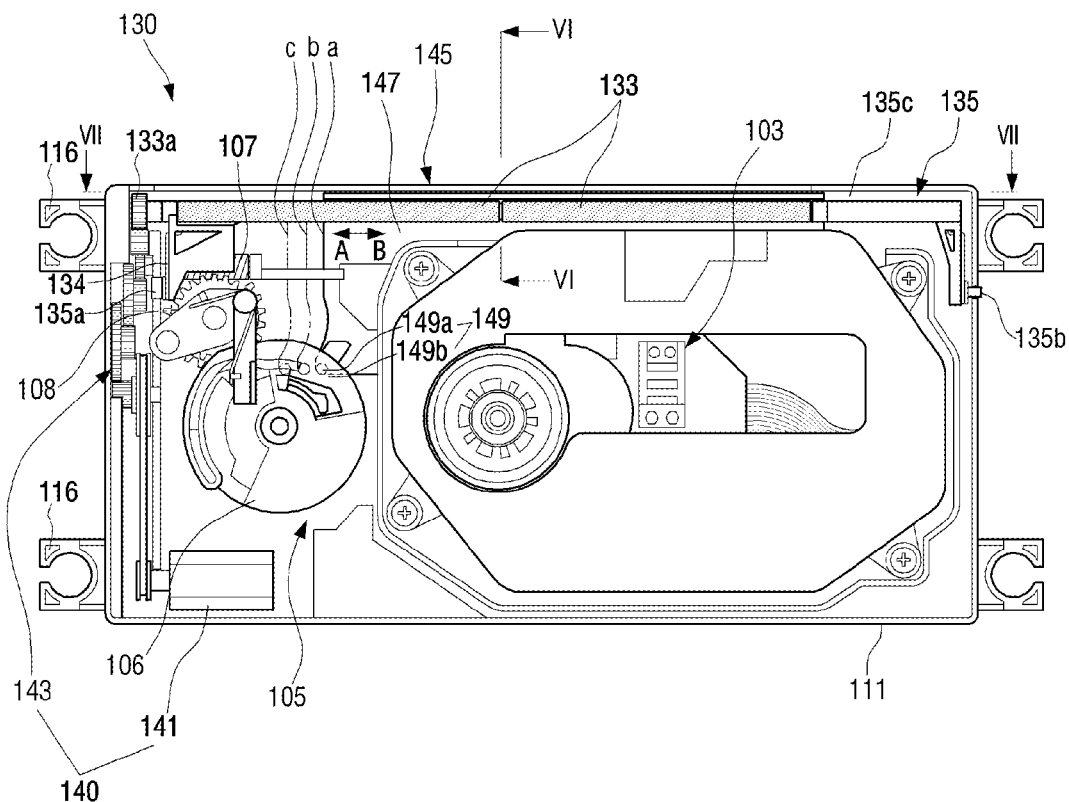
FIG. 12 is a top plan view of a rectangular member of a main body casing of the disc drive apparatus shown along line III-III of FIG. 10.
Figure 13:
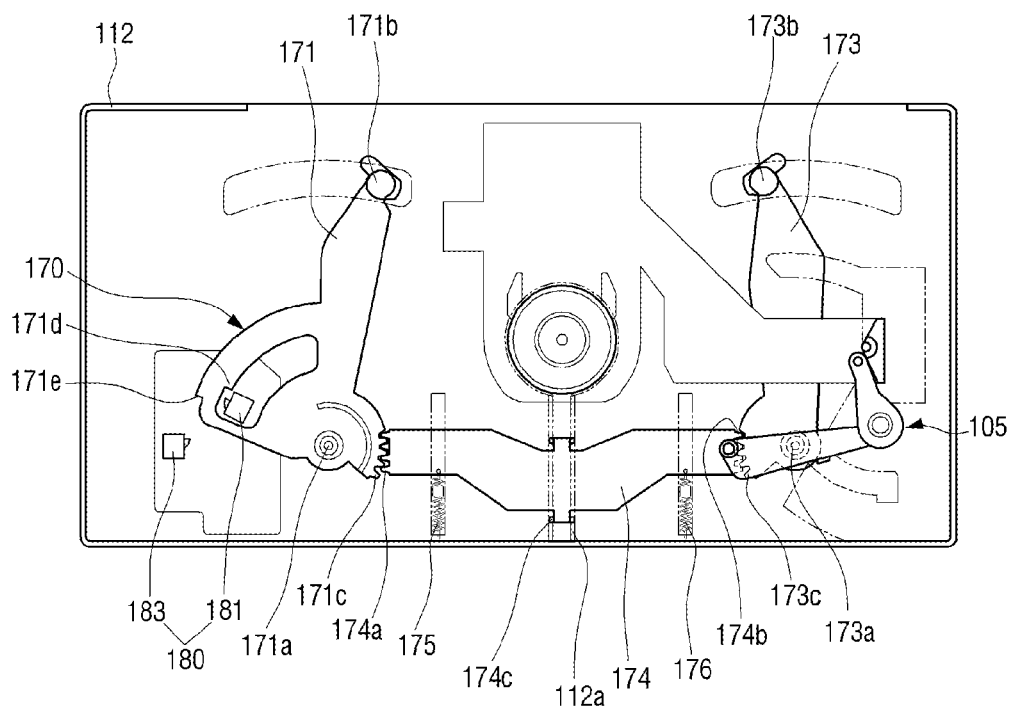
FIG. 13 is a top plan view of a plate member of the main body casing of the disc drive apparatus shown along line IV-IV of FIG. 10.

Next, assuming that in a disc drive apparatus 100 designed, so that to reduce power consumption, if the disc drive apparatus 100 or/and the other image and/or audio equipment is turned off, the power supply to the disc detection sensor 132 is also shut off, the disc drive apparatus 100 is in a turned-OFF state, a disc D is inserted into the main body casing 110 through the cover slot 152 of the first cover 151 and the first slot 114 of the main body casing 110 by the user, as shown in FIG. 9 (S1').

At this time, since the loading roller 133 is maintained in the intermediate position, as shown in FIGS. 6A and 7A, that is, the position where it does not come in contact with the disc D while being spaced by the thickness of the disc D, for example, approximately 0.5 mm, apart from the disc D, the disc D can be smoothly inserted into the main body casing 110 by the user.

After that, when the first sensing arm 171 operates the sensing switch 180 as the first and the second sensing arms 171 and 173 are pushed by the disc D to rotate about the first and the second rotation axes 171a and 173a, the micro switches of the first and the second switches 181 and 183 of the sensing switch 180 outputs 'ON' signals to the control unit (S2').

According the 'ON' signals from the sensing switch 180, the control unit controls the driving motor 141 to drive, for example, in a normal direction. Subsequent operations are the same as the operation steps S3~S6 in case that the disc drive apparatus 100 is in the turned-on state, as explained above.

As explained above, although the disc drive apparatus 100 according to the first exemplary embodiment is explained and illustrated as having the disc detecting sensor 131 made up of the optical sensor, the present inventive concept is not limited thereto. For instance, the disc detecting sensor 131 may be a micro switch, which is physically operated by the disc D, like the sensing switch 180. At this time, even though the disc drive apparatus 100 is designed, so that to reduce power consumption, if the disc drive apparatus 100 or/and the other image and/or audio equipment is turned off, the power supply to the disc detection sensor 132 is also shut off, the disc detecting sensor 131 can normally operate during the insertion of the disc D. Accordingly, in this case, regardless of whether the disc drive apparatus 100 is in the turned-on/off state, the disc detecting sensor 131 is operated in the same manner as the operation steps S1~S6 in case that the disc drive apparatus 100 is in the turned-on state, as explained above.

As apparent from the foregoing, the disc drive apparatus 100 according to the first exemplary embodiment is configured to have the first and the second cover 151 and 155 disposed at the upper and lower surfaces of the main body casing 110 to cover and close up the rear and front portions of the disc D projected outside the main body casing 110 through the first and the second slots 114 and 115, respectively, when the disc D is in the chucking position. Accordingly, the disc drive apparatus 100 can maximally prevent the foreign substances, such as dust or the like, from getting into the main body casing 100 through the estrangement space between the disc drive apparatus and the other image and/or audio equipment combined therewith and/or the front and the rear portions of the disc exposed outside the main body casing 110 in use as in the related art disc-visible type disc drive apparatus, and also absorb or shut off the noises generated in the main body casing 110, thereby minimizing the leakage thereof outside the main body casing 110.

Further, the disc drive apparatus 100 according to the first exemplary embodiment is configured to have the disc detecting sensor 131 capable of detecting the insertion of the disc D into the first cover 151 located in front of the loading roller 133. Accordingly, the disc drive apparatus 100 can be operated, so that the disc detecting sensor 131 detects the disc D thus to operate the loading roller 133 as soon as the disc D is inserted. Thus, a loading speed of the disc D can be improved.

Also, the disc drive apparatus 100 according to the first exemplary embodiment is configured to have the loading roller lifting part 145 capable of moving the loading roller support 135 supporting the loading roller 133 to the intermediate position (FIG. 6A), when the disc D, a portion of which is projected outside the first cover 151 during the disc ejecting, is removed to the outside from the first cover 151 by the user. Accordingly, when the disc D is inserted into the main body casing 110 at the initial operation state where there is no disc therein, the disc drive apparatus 100 can smoothly insert the disc D into the main body casing 110 even though the disc D enters the main body casing 110 before the disc detecting sensor 131 operates. Also, even though the disc drive apparatus 100 is designed, so that if the disc drive apparatus 100 or/and the other image and/or audio equipment is turned off, the power supply to the disc detection sensor 132 is also shut off, when the disc D is inserted into the main body casing 110, it can arrive at the first and the second sensing arms 171 and 173 without coming in contact with the loading roller 133, to operate the disc detecting sensor 131 for detecting the insertion thereof and thereby operating the driving motor 141 through the first sensing arm 171. Accordingly, a disc inserting sensation of the user can be improved Second Embodiment Referring to FIGS. 10 to 13, there is illustrated a disc drive apparatus 100' according to a second exemplary embodiment.

Such a disc drive apparatus 100' of the second exemplary embodiment has the same construction as that of the disc drive apparatus 100 of the first exemplary embodiment, except that it is not provided with the protection cover 150 and the disc detection sensor 131 disposed in the protection cover 150, as compared with the disc drive apparatus 100 of the first exemplary embodiment.

In other words, the disc drive apparatus 100' of the second exemplary embodiment includes a main body casing 110 and a disc loading unit 130, and the disc loading unit 130 includes a loading roller 133, a loading roller lifting part 145, a sensing arm part 170, and a sensing switch 180 including first and second switch 181 and 183. Here, constructions of respective components of the main body casing 110 and the disc loading unit 130 are the same as those of the disc drive apparatus 100 of the first exemplary embodiment. Accordingly, detailed explanations on the respective components of the main body casing 110 and the disc loading unit 130 will be omitted.

Figure 14:
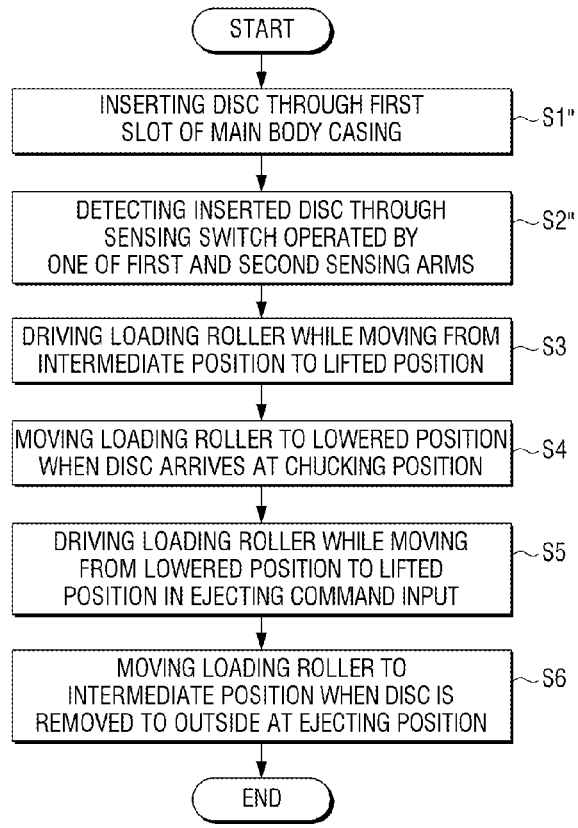
FIG. 14 is a flow chart showing an operation of the disc drive apparatus according to the second exemplary embodiment.

A driving process of the disc drive apparatus 100' according to the second exemplary embodiment as constructed as described above will now be described with reference to FIG. 14.

First, a disc D is inserted into the main body casing 110 through the first slot 114 of the main body casing 110 by the user (S1").

At this time, since the loading roller 133 is maintained in the intermediate position, as shown in FIGS. 6A and 7A, that is, the position where it does not come in contact with the disc D while being spaced by the thickness of the disc D, for example, approximately 0.5 mm, apart from the disc D, the disc D can be smoothly inserted into the main body casing 110 by the user.

After that, when a first sensing arm 171 operates the first and the second switch 181 and 183 of the sensing switch 180 as the first and a second sensing arms 171 and 173 are pushed by the disc D to rotate about first and second rotation axes 171a and 173a, the micro switches of the first and the second switches 181 and 183 of the sensing switch 180 outputs 'ON' signals to the control unit (S2").

According the 'ON' signals from the sensing switch 180, the control unit controls a driving motor 141 to drive, for example, in a normal direction. Subsequent operations are the same as the operation steps S3~S6 in case that the disc drive apparatus 100 of the first exemplary embodiment is in the turned-on state, as explained above.

According to such a disc drive apparatus 100' of the second exemplary embodiment, since the loading roller 133 is located in the intermediate position, as shown in FIGS. 6A and 7A, in a state where the disc D is removed outside of the main body casing 110, the disc D can be smoothly inserted into the main body casing 110, such as when a user wants to reproduce information recorded on the disc D or record information on the disc D, it is inserted through the first slot 114 of the main body casing 110. Accordingly, the user can feel a smooth disc inserting sensation in an initial operation stage until the loading roller 133 operates, as compared with the related art disc-visible disc drive apparatus.

Third Embodiment

Figure 15:
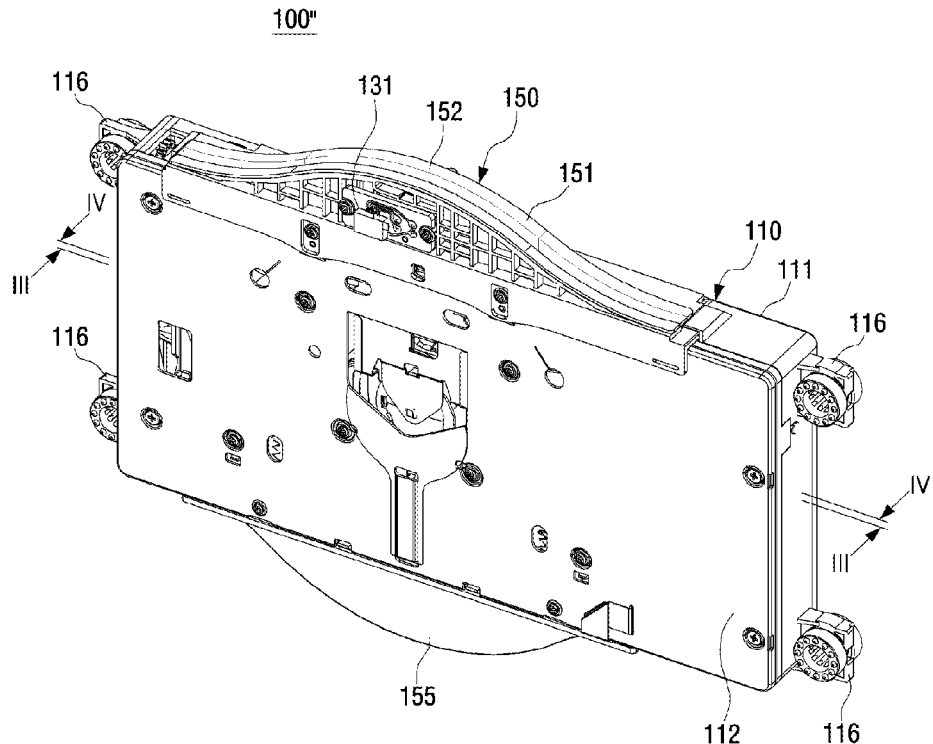
FIG. 15 is a perspective view showing a disc drive apparatus according to a third exemplary embodiment.
Figure 16:
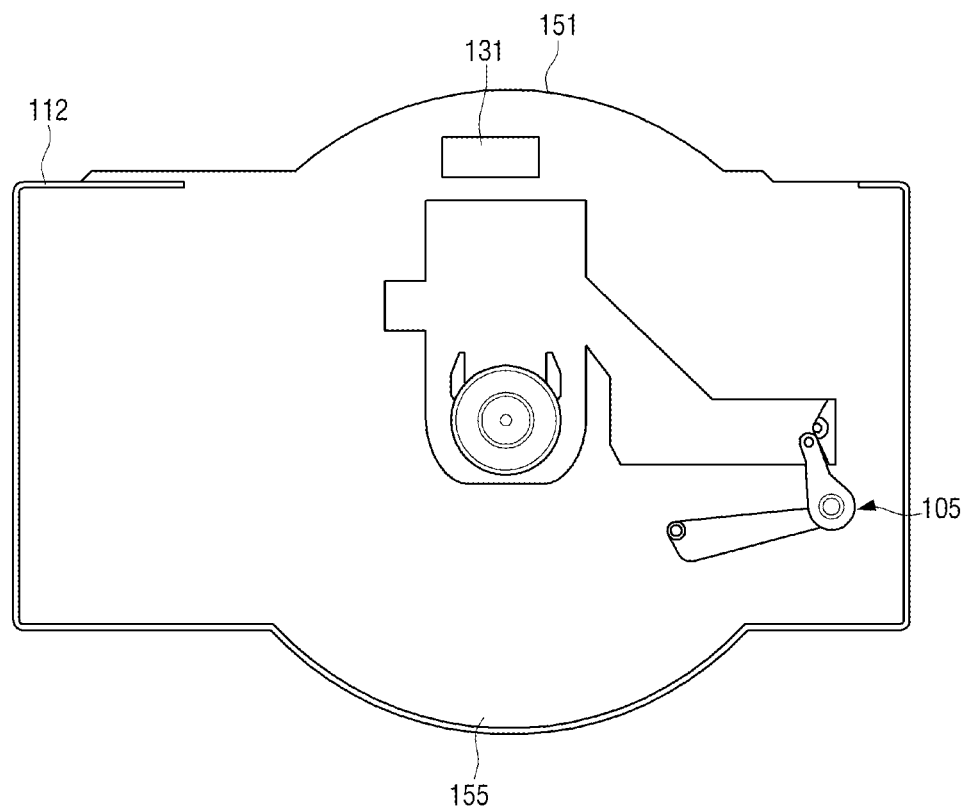
FIG. 16 is a top plan view of a plate member of a main body casing of the disc drive apparatus shown along line IV-IV of FIG. 15.

Referring to FIGS. 15 and 16, there is illustrated a disc drive apparatus 100" according to a third exemplary embodiment.

Such a disc drive apparatus 100" of the third exemplary embodiment has the same construction as that of the disc drive apparatus 100 of the first exemplary embodiment, except that as shown in FIG. 16, it is not provided with the sensing arm part 170 disposed in the main body casing 110 and the sensing switch 180 including the first and the second switches 181 and 183 and the disc detecting sensor 131 is made up of a micro switch, which is physically operated by the disc D, as compared with the disc drive apparatus 100 of the first exemplary embodiment.

In other words, the disc drive apparatus 100" of the third exemplary embodiment includes a main body casing 110, a disc loading unit 130 and a protection cover 150, and the disc loading unit 130 includes a loading roller 133 and a loading roller lifting part 145, as shown in FIGS. 1 to 4, 15 and 16. Here, constructions of respective components of the main body casing 110, the disc loading unit 130 and the protection cover 150 are the same as those of the disc drive apparatus 100 of the first exemplary embodiment. Accordingly, detailed explanations on the respective components of the main body casing 110, the disc loading unit 130 and the protection cover 150 will be omitted.

According to the disc drive apparatus 100" of the third exemplary embodiment as constructed above, since the disc detecting sensor 131 for detecting an insertion of the disc D is made up of the a micro switch, which is physically operated by the disc D, the disc detecting sensor 131 can operate to sense the insertion of the disc D, regardless of whether the disc drive apparatus 100" is in the turned-on/off state. Accordingly, a driving process of the disc drive apparatus 100" of the third exemplary embodiment may be carried out in the same way as the operation steps S1~S6 in case that the disc drive apparatus 100 of the first exemplary embodiment is in the turned-on state, as explained above.

However, in this case, since there is no sensing arm part 170 and no sensing switch 180 (181, 183) installed in the main body casing 110, the disc drive apparatus 100" does not perform operations, which determine a size of the disc D according whether the sensing switch 180 (181, 183) is operated and which control a driving time of the driving motor 141 or the like according to the determined result. Accordingly, the disc drive apparatus 100" of the third exemplary embodiment is adapted to record information on a disc D of any given size or reproduce information record on the disc D of any given size.

Although the present inventive concept has been illustrated and explained by the exemplary embodiments, it is not limited to the foregoing exemplary embodiments. The present teaching can be readily applied to other types of apparatuses and many alternatives, modifications, and variations will be apparent to those skilled in the art. Thus, the scope is not to be construed as being limited to the description of the exemplary embodiments, and is to be construed by the attached claims and equivalents.

The invention claimed is:

1. A disc visible type disk drive apparatus, comprising:
   a main body casing having a first slot provided at a first side surface to load a disc;
   a protection cover having a first cover provided on the first side surface of the main body casing, wherein the first cover covers a portion of the disc exposed outside the main body casing through the first slot and forms a passage through which the disc passes during loading and unloading;
   a disc detecting sensor disposed in the first cover which detects the disc; and
   a disc loading unit disposed in the main body casing and having a loading roller which is driven so as to load the disc if the disc is detected by the disc detecting sensor.

2. The apparatus of claim 1, wherein the main body casing further comprises a second slot provided at a second side surface disposed opposite to the first side surface and which passes through the disc, and
   wherein the protection cover further comprises a second cover, which is provided on the second side surface of the main body casing and which covers a portion of the disc exposed outside the main body casing.

3. The apparatus of claim 2, wherein the second cover closes the portion of the disc exposed outside the main body casing through the second slot, so as not to let the portion of the disc be exposed outside of the main body casing.

4. The apparatus of claim 1, wherein the loading roller is disposed to pivot between a first position blocking the first slot and a second position opening the first slot,
   wherein the disc loading unit further comprises:
   a loading roller lifting part which lifts and lowers the loading roller between the first position and the second position; and
   a drive part to drive the loading roller and the loading roller lifting part according to an operation of the disc detection sensor and a drive command which is input.

5. The apparatus of claim 4, wherein the loading roller lifting part moves the loading roller to the first position if the disc is in an ejecting position, to the second position if in a chucking position and to a third position not coming in contact with the disc if removed outside the main body casing.

6. The apparatus of claim 5, wherein the loading roller lifting part comprises:

a loading roller support which supports the loading roller to be pivotable between the first position and the second position;
a lifting protrusion provided on the loading roller support;
a slider having a lifting cam groove which accommodates and guides the lifting protrusion to lift or lower the lifting protrusion as the slider is being moved right and left; and
a slider moving portion to move the slider right and left.

7. The apparatus of claim 6, wherein the lifting cam groove guides the lifting and lowering of the lifting protrusion, so that the loading roller support causes the loading roller be pivotable to one of the first position, the second position and the third position.

8. The apparatus of claim 6, wherein the slider moving portion comprises:
a moving protrusion projected from the slider; and
a moving guide groove, which is provided in a cam gear of a chucking unit driven by the drive part, and which moves the moving protrusion right and left according to a rotation of the cam gear.

9. The apparatus of claim 1, wherein the disc detection sensor comprises one of an optical sensor and a micro switch.

10. The apparatus of claim 4, wherein the disc loading unit further comprises:
a sensing arm part disposed in the main body casing and having first and second sensing arms, each of which has a hanging protrusion projected into a disc moving path to be moved by the disc; and
at least one sensing switch, which is disposed in the main body casing and is operated by one of the first and second sensing arms, and which senses the disc.

11. A disc drive apparatus, comprising:
a main body casing having a slot to load a disc;
a sensing unit disposed in the main body casing to sense the disc; and
a loading roller disposed in the main body casing to be pivotable between a first position blocking the slot and a second position opening the slot,
wherein the loading roller is maintained in a third position if there is no disc in the main body casing, wherein the third position is between the second position and the first position where the loading roller would not come in contact with the area the disc would occupy when inserted,
wherein the loading roller is operated to load the disc into the main body casing and to pivot from the third position to the first position if the disc is detected by the sensing unit.

12. The apparatus of claim 11, further comprising:
a loading roller lifting part to lift and lower the loading roller between the first position and the second position according to an operation of the sensing unit and an outer ejecting command.

13. The apparatus of claim 12, wherein the loading roller lifting part comprises:
a loading roller support to support the loading roller to be pivotable between the first position and the second position;
a lifting protrusion provided on the loading roller support;
a slider having a lifting cam groove to accommodate and guide the lifting protrusion to lift or lower the lifting protrusion as the slider is being moved right and left; and
a slider moving portion to move the slider right and left.

14. The apparatus of claim 13, wherein the lifting cam groove is provided to guide the lifting and lowering of the lifting protrusion, so that the loading roller support causes the loading roller be pivotable to one of the first position, the second position and the third position.

15. The apparatus of claim 12, further comprising:
a drive part to drive the loading roller and the loading roller lifting part; and
a slider moving portion comprising:
a moving protrusion projected from the slider; and
a moving guide groove formed in a cam gear of a chucking unit driven by the drive part, to move the moving protrusion right and left according to a rotation of the cam gear.

16. The apparatus of claim 2, wherein the first and the second covers each have an arc-like shape.

17. The apparatus of claim 5, wherein the third position comprises one of the second position and an intermediate position where, if the disc is inserted into the main body casing, the loading roller is positioned in a state just before coming in contact with the disc, which is being inserted.

18. The apparatus of claim 17, wherein the third position comprises one of the second position and the intermediate position.

19. The apparatus of claim 11, wherein the third position comprises an intermediate position where, if the disc is inserted into the main body casing, the loading roller is positioned in a state just before coming in contact with the disc, which is being inserted.

20. The apparatus of claim 11, wherein the sensing unit comprises:
a sensing arm part disposed in the main body casing and having first and second sensing arms, each of which has a hanging protrusion projected into a disc moving path to be moved by the disc; and
at least one sensing switch, which is disposed in the main body casing to be operated by one of the first and second sensing arms, and which senses the disc.

21. The apparatus of claim 20, wherein the at least one sensing switch includes first and second switches, which are operated by first and second operating portions, respectively, wherein the first and second switches are provided on an outer side of a lower portion of the first sensing arm.

* * * * *